United States Patent
Nakagawa

(10) Patent No.: US 7,719,460 B1
(45) Date of Patent: May 18, 2010

(54) RADAR DEVICE

(75) Inventor: Kado Nakagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/424,850

(22) Filed: Apr. 16, 2009

(30) Foreign Application Priority Data

Nov. 4, 2008 (JP) .............................. 2008-283220

(51) Int. Cl.
G01S 13/42 (2006.01)
(52) U.S. Cl. .................... 342/70; 342/107; 342/108; 342/115; 342/130; 342/132; 342/133; 342/135; 342/139; 342/145; 342/146; 342/189; 342/192; 342/196
(58) Field of Classification Search ............. 342/70–72, 342/107–113, 115, 116, 130–135, 139, 145–147, 342/189, 192, 195, 196
See application file for complete search history.

(56) References Cited

U.S. PATENT DOCUMENTS

| | | | | |
|---|---|---|---|---|
| 5,751,240 | A * | 5/1998 | Fujita et al. ................ | 342/70 |
| 5,905,458 | A * | 5/1999 | Ashihara ................... | 342/70 |
| 6,657,582 | B2 * | 12/2003 | Seki et al. ................. | 342/70 |
| 7,532,154 | B2 * | 5/2009 | Noda ........................ | 342/107 |
| 2003/0128154 | A1 * | 7/2003 | Nakanishi et al. ......... | 342/107 |
| 2004/0252047 | A1 * | 12/2004 | Miyake et al. ............. | 342/107 |
| 2006/0214839 | A1 * | 9/2006 | Mitsumoto ................ | 342/70 |
| 2008/0042895 | A1 * | 2/2008 | Inaba ........................ | 342/112 |
| 2008/0224918 | A1 * | 9/2008 | Shimizu .................... | 342/147 |
| 2008/0231496 | A1 * | 9/2008 | Sakamoto .................. | 342/59 |
| 2009/0073026 | A1 * | 3/2009 | Nakagawa ................. | 342/107 |
| 2009/0309782 | A1 * | 12/2009 | Takabayashi et al. ...... | 342/105 |
| 2009/0309784 | A1 * | 12/2009 | Natsume .................... | 342/189 |

FOREIGN PATENT DOCUMENTS

| | | | |
|---|---|---|---|
| GB | 2172461 A | * | 9/1986 |
| JP | 05333143 A | * | 12/1993 |
| JP | 05341038 A | * | 12/1993 |
| JP | 06082551 A | * | 3/1994 |
| JP | 2006-145251 A | | 6/2006 |

OTHER PUBLICATIONS

Ralph O. Schmidt, "Multiple Emitter Location and Signal Parameter Estimation", IEEE Transactions On Antennas and Propagation, Mar. 1986, pp. 276-280, vol. AP-34, No. 3.

* cited by examiner

*Primary Examiner*—John B Sotomayor
(74) *Attorney, Agent, or Firm*—Sughrue Mion, PLLC

(57) ABSTRACT

In a radar device including a transmitting unit for transmitting a transmission signal having plural modulation sections, a receiving unit for receiving a reflection signal obtained through reflection of the transmission signal from a target by an array antenna having plural channels, a mixing unit for mixing the transmission signal with reception signals of the plural channels to obtain beat signals of the plural channels, a frequency analyzing unit for frequency-analyzing the beat signals of the plural channels, and a direction calculating unit for calculating the direction to the target on the basis of frequency analysis results of the plural channels, the direction calculating unit adds correlation matrixes generated from peak frequency spectra of the plural modulation sections to obtain an summed correlation matrix, and calculating the direction to the target on the basis of the summed correlation matrix.

9 Claims, 4 Drawing Sheets

⋮

RADAR DEVICE

BACKGROUND OF THE INVENTION

1. Field of the Invention

The present invention relates to a radar device for applying a transmission signal (electronic waves) to a target object (hereinafter referred to as "target"), receiving a reflection signal based on the transmission signal from the target by plural receiving units and calculating target information on the basis of the reflection signal.

2. Description of the Related Art

As a radar device for calculating the distance to a target and the relative speed has been hitherto known a frequency-modulation radar device in which a transmission signal having continuously-modulated frequencies is transmitted to a target, a reflection signal from the target is received and the distance to the target and the relative speed are calculated.

A method of mechanically turning a transmission unit to sweep a transmission signal and calculating the direction to a target is known as a method of calculating the target direction in this type radar device. Furthermore, there is also known a super-resolution incoming direction (arrival direction) estimation processing such as Music (Multiple Signal Classification) method of outputting a transmission signal without mechanically turning the transmission unit and executing digital signal processing on a reception signal received by an array antenna comprising plural channels to calculate the direction to a target (for example, R. O. Schmidt "Multiple Emitter Location and Signal Parameter Estimation" IEEE Trans. Ap-34, No. 3, pp. 276-280 (1986); hereinafter referred to as "non-patent document").

According to the MUSIC method disclosed in the non-patent document, a correlation matrix of a peak frequency spectrum is calculated, the correlation matrix is subjected to an eigendecomposition, an angle spectrum is calculated from an eigenvector and the direction to a target is calculated from the angle spectrum. Furthermore, for example, according to a method disclosed in JP-A-2006-145251 (hereinafter referred to as "patent document"), a reception vector is not generated by using only the peak frequency of a peak waveform, but reception vectors are also generated by using other frequencies belonging to the same peak waveform. In this case, the correlation matrixes thereof are calculated and added, whereby the number of snapshots used to calculate the correlation matrixes is secured.

The super-resolution incoming direction estimation processing which is represented by the technique disclosed in the non-patent document is based on the assumption that the respective incoming waves are irrelevant to one another. Therefore, it cannot be directly applied to land mobile communication or the like in which the correlation among the respective incoming waves is very high. In order to suppress the correlation among the incoming waves, it is generally desired to increase the number of reception signals used to generate the correlation matrix (the number of snapshots).

Accordingly, a correlation matrix is obtained every measurement in the radar device, and thus there is known a so-called time averaging method in which the number of snapshots is secured by utilizing correlation matrixes obtained through past measurements executed over plural periods. With respect to the time averaging method in which the number of snapshots is secured by utilizing the correlation matrixes obtained through the past measurements executed at plural periods, when it is applied to a mobile object such as an in-vehicle mount radar device or the like, the positional relationship with a target is varied in accordance with the measurement timing, and thus the incoming direction of electronic wave is varied. Therefore, when it takes longtime to secure the number of snapshots, the precision of the correlation matrix (and thus the estimation precision of the incoming direction of the electronic wave) is lowered.

On the other hand, according of the patent document described above, in order to secure the number of snapshots, a reception vector is not generated from only the peak frequency of a peak waveform, but reception vectors are also generated from other frequencies belonging to the same peak waveform, and the correlation matrixes thereof are calculated. Therefore, the calculation is complicated, and also the direction to a target cannot be calculated with high precision because the frequencies other than the peak frequency are used.

SUMMARY OF THE INVENTION

The present invention has been implemented to solve the above problems, and has an object to provide a radar device that can secure a snapshot number in short time and calculate the direction to a target with high precision in a radar device for calculating the direction to the target on the basis of a frequency analysis result of plural channels.

In order to attain the above object, a radar device according to the present invention is equipped with a transmitting unit for transmitting a transmission signal having plural modulation sections, a receiving unit for receiving reflection signals obtained through reflection of the transmission signal from targets by an array antenna having plural channels, a mixing unit for mixing the transmission signal with reception signals of the plural channels to obtain beat signals of the plural channels, a frequency analyzing unit for frequency-analyzing the beat signals of the plural channels; and a direction calculating unit for calculating the direction to the target on the basis of frequency analysis results of the plural channels, wherein the direction calculating unit sums correlation matrixes generated from peak frequency spectra of the plural modulation sections to obtain a summed correlation matrix, and calculating the direction to the target on the basis of the summed correlation matrix.

According to the present invention, the correlation matrixes generated from the peak frequency spectra of the plural modulation sections which are obtained at the same measurement period are used to calculate the direction to the target, thereby securing a snapshot number, and the direction to the target is calculated on the basis of the summed correlation matrix obtained by adding the plural correlation matrixes. Therefore, the snapshot number can be secured in short time, and the angle can be calculated with higher precision as the number of the modulation sections is larger.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENT

A preferred embodiment according to the present invention will be described hereunder with reference to the accompanying drawings.

Figure 1:
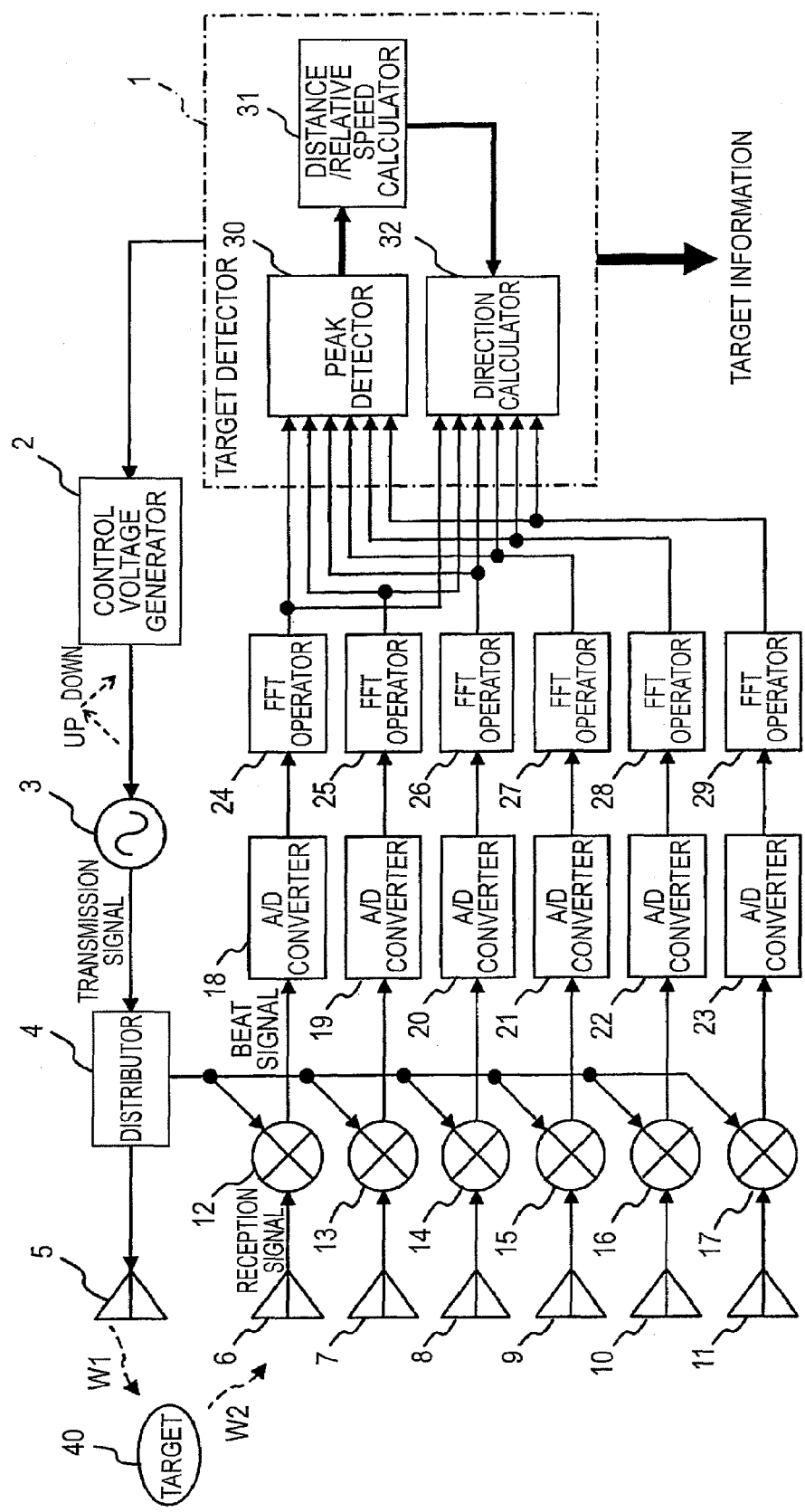
FIG. 1 is a block diagram showing a radar device according to an embodiment of the present invention.

FIG. 1 is a block diagram showing a radar device according to an embodiment of the present invention.

In FIG. 1, a radar device has a target detector 1 comprising a microcomputer, a control voltage generator 2 for outputting a control voltage under the control of the target detector 1, VCO (Voltage Controlled Oscillator) 3 for outputting a transmission signal whose frequency is subjected to UP/DOWN modulation on the basis of the control voltage, a distributor 4 for distributing a transmission signal, and a transmission antenna 5 (transmission unit) for emitting a transmission signal W1 to a target 40.

The radar device also has array type reception antennas 6 to 11 (reception unit) of plural channels (for example, 6 channels) for receiving a reflection signal W2 which is obtained through reflection of the transmission signal W1 from the target 40, mixers 12 to 17 (mixing unit) for mixing the transmission signal distributed by the distributor 4 with the reception signals of the plural channels to obtain beat signals of the plural channels, A/D converters 18 to 23 for A/D-converting the beat signals of the plural channels, and FFT (Fast Fourier Transform) operators 24 to 29 (frequency analysis unit) for executing frequency analysis on the A/D-converted beat signals of the plural channels.

The frequency analysis results of the beat signals of the plural channels (the beat frequency spectra of the plural channels) from the FFT operators 24 to 29 are input to the target detector 1. The target detector 1 calculates the distance to the target 40, the relative speed of the target 40 or the direction to the target 40, and outputs it as target information to an external device (not shown).

In order to attain the target information, the target detector 1 has a peak detector 30 for detecting the peak frequency from the frequency analysis results of the beat signals, a distance/relative speed calculator 31 for calculating the distance R to the target 40 and the relative speed V of the target 40 on the basis of the peak frequency, and a direction calculator 32 for calculating the direction θ to the target 40 on the basis of the beat frequency spectra of the plural channels, the distance R and the relative speed V.

The operation of the embodiment according to the present invention shown in FIG. 1 will be described.

When a modulation start instruction is output from the target detector 1 to the control voltage generator 2, a control voltage of a modulation section (for example, triangular UP/DOWN) is applied from the control voltage generator 2 to VCO (Voltage Controlled Oscillator) 3, and a transmission signal which is subjected to frequency modulation in the UP section/Down section according to the control voltage is output from VCO 3.

The transmission signal is distributed through the distributor 4 to the transmission antenna 5 and the mixers 12 to 17, and emitted from the transmission antenna 5 to the target 40.

Furthermore, a reflection signal W2 reflected from the target 40 is received as reception signals of six channels (CH1 to CH6) by plural (for example, six) reception antennas 6 to 11, and each of the reception signals is mixed with the transmission signal by each of the mixers 12 to 17.

Accordingly, beat signals corresponding to the six channels are generated from the mixers 12 to 17, and each beat signal is converted to digital data in each of the A/D converters 18 to 23 with respect to each of the UP section in which the frequency increases with time lapse and the DOWN section in which the frequency decreases with time lapse.

The digital data generated from the A/D converters 18 to 23 are individually subjected to frequency analysis using FFT by the FFT operators 24 to 29 (frequency analysis unit). The frequency analysis results of the six channels (the beat frequency spectra) calculated by the FFT operators 24 to 29 are input to the target detector 1 with respect to each of the UP section and the DOWN section.

In the target detector 1, the peak detector 30 first detects the peak frequency from the frequency analysis results of the six channels. Subsequently, the distance/relative speed calculator 31 calculates the distance to the target 40 and the relative speed of the target 40 on the basis of the detected peak frequency. At this time, the calculation value of impossible distance or relative speed is not regarded as information of the target 40 and thus it is excluded.

Finally, the direction calculator 32 executes super-resolution incoming direction estimation processing on the beat frequency spectrum corresponding to the peak frequency used to calculate the distance and the relative speed, thereby calculating the direction θ of the target 40. In this case, the MUSIC method described above is used as the super-resolution incoming direction estimation processing.

Specifically, as described later, the direction calculator 32 generates a summed correlation matrix by adding a correlation matrix generated from the UP-section peak frequency spectrum and a correlation matrix generated from the DOWN-section peak frequency spectrum, and calculates the direction to the target 40 or the number of targets on the basis of an eigenvalue and an eigenvector.

Figure 4:
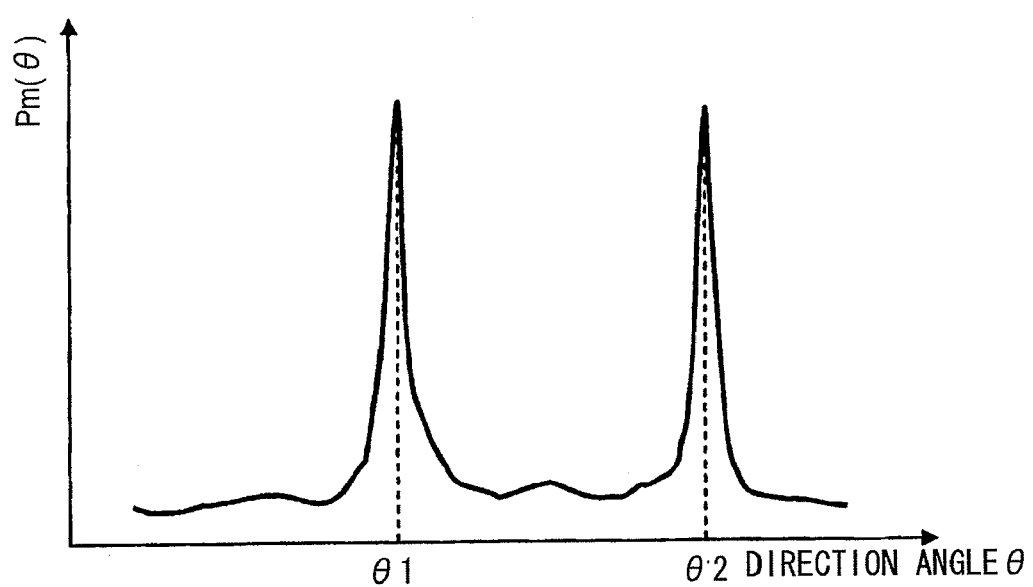
FIG. 4 is a diagram showing the processing of an MUSIC spectrum in the embodiment of the present invention.

The operation of the target detector 1 shown in FIG. 1 will be described with reference to FIGS. 2 to 4.

Figure 2:
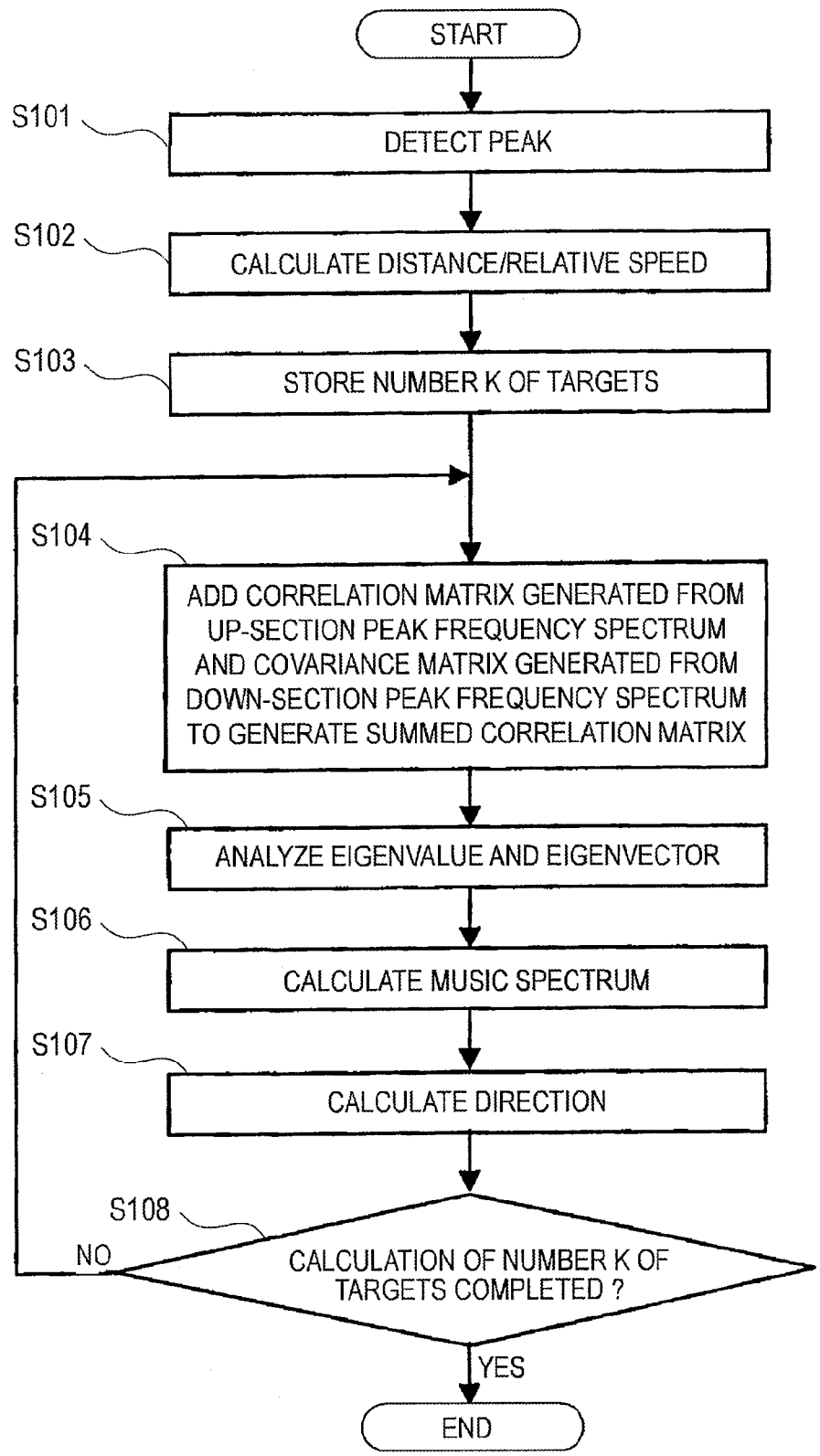
FIG. 2 is a flowchart showing the operation of a target detector according to the embodiment of the present invention.
Figure 3A:
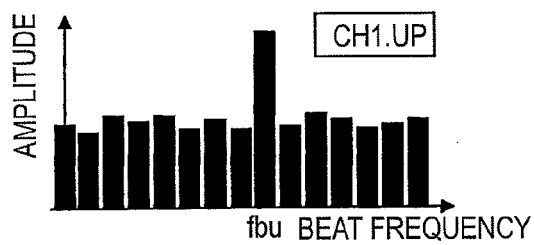
FIG. 3 is a diagram showing the amplitude of each complex spectrum every channel and every modulation section in the embodiment of the present invention.
Figure 3B:
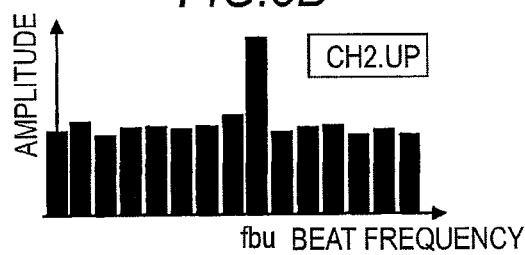
Figure 3G:
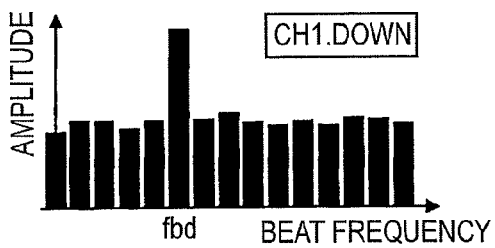
Figure 3H:
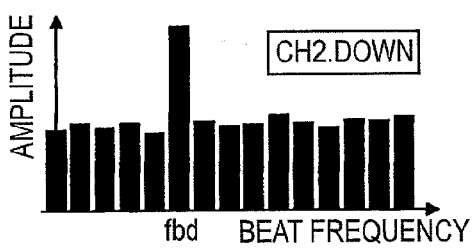
Figure 3F:
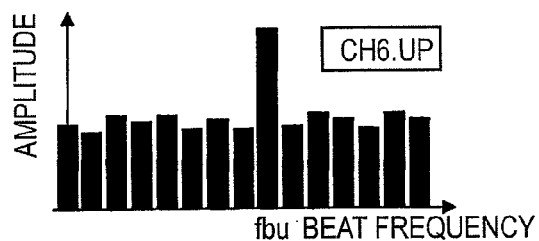
Figure 3I:
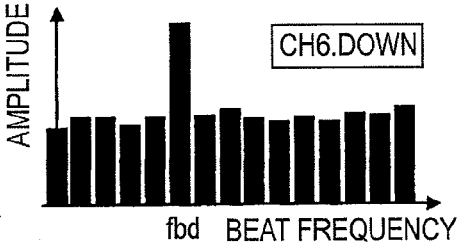

FIG. 2 is a flowchart showing the operation procedure of the target detector 1. FIG. 3 is a diagram showing the processing of step S101 in FIG. 2, and shows the amplitudes of input beat frequency spectra of six channels. FIG. 4 is a diagram showing the processing of step S106 in FIG. 2, and shows an example of a MUSIC spectrum.

In FIG. 2, the peak detector 30 first detects the peak with respect to the amplitudes of the beat frequency spectra of the six channels (step S101). Specifically, as shown in FIG. 3, a detection threshold value is provided for the amplitudes of the beat frequency spectra of the six channels, and the amplitude of a beat frequency which is above the detection threshold value and also larger than the amplitude of each of beat frequencies before and after the beat frequency concerned is judged as the peak.

In FIG. 3, (a) to (f) show the amplitudes of the beat frequency spectra of the six channels at UP, and (g) to (l) shows the amplitudes of the beat frequency spectra of the six channels at DOWN. In each graph, the abscissa axis represents the beat frequency, and the ordinate axis represents the amplitude. Furthermore, the peak frequency having the peak amplitude is represented by "fbu" in the UP section and by "fbd" in the DOWN section.

Returning to FIG. 2, the distance/relative speed calculator 31 calculates the distance R to the target 40 and the relative speed V of the target 40 on the basis of the peak frequencies fbu and fbd obtained in step S1 according to the principle of general FM-CW (Frequency Modulation Continuous Wave) radar (step S102). That is, the distance R is calculated according to the following equation (1).

$$R = \frac{cT}{4f_m}(f_{bu} + f_{bd}) \quad (1)$$

Furthermore, the relative speed V is calculated according to the following equation (2).

$$V = -\frac{c}{4f_c}(f_{bu} - f_{bd}) \quad (2)$$

In the equation (1) and the equation (2), c represents velocity of light, T represents one modulation time, fm represents frequency modulation width and fc represents the frequency of carrier wave. Subsequently, the distance/relative speed calculator 31 counts and stores the number K of the targets 40 (step S103).

Next, the direction calculator 32 generates a correlation matrix to be used for the MUSIC method (step S104). The summed correlation matrix Rc obtained by adding the correlation matrix generated from the UP-section peak frequency spectrum and the correlation matrix generated from the DOWN-section peak frequency spectrum is 6×6 order, and it is represented by the following equation (3).

$$R_c = \begin{bmatrix} X_1 \cdot X_1^* & X_1 \cdot X_2^* & \Lambda & X_1 \cdot X_6^* \\ X_2 \cdot X_1^* & X_2 \cdot X_2^* & \Lambda & X_2 \cdot X_6^* \\ M & M & O & M \\ X_6 \cdot X_1^* & X_6 \cdot X_2^* & \Lambda & X_6 \cdot X_6^* \end{bmatrix} + \begin{bmatrix} Y_1 \cdot Y_1^* & Y_1 \cdot Y_2^* & \Lambda & Y_1 \cdot Y_6^* \\ Y_2 \cdot Y_1^* & Y_2 \cdot Y_2^* & \Lambda & Y_2 \cdot Y_6^* \\ M & M & O & M \\ Y_6 \cdot Y_1^* & Y_6 \cdot Y_2^* & \Lambda & Y_6 \cdot Y_6^* \end{bmatrix} \quad (3)$$

In the above equation (3), Xi represents the beat frequency spectrum of the peak frequency fbu at the i-th (i=1, ..., 6) channel (CHi), and Yi represents the beat frequency spectrum of the peak frequency fbd at i-th (i=1, ..., 6) channel (CHi). Xi* represents the complex conjugate of Xi, and Yi* represents the complex conjugate of Yi.

Furthermore, the direction calculator 32 analyze the eigenvalue and the eigenvector for the correlation matrix Rc to determine eigenvalues $\lambda$1 to $\lambda$6 and corresponding eigenvectors e1 to e6 (step S105).

Subsequently, the direction calculator 32 calculates an angle spectrum Pm($\theta$) (MUSIC spectrum) on the basis of the general MUSIC method by using the eigenvalues $\lambda$1 to $\lambda$6 and the eigenvectors e1 to e6 according to the following equation (4) (step S106).

$$P_m(\theta) = \frac{\|a(\theta)\|^2}{\sum_{i=K+1}^{6} |e_i^H a(\theta)|^2}, \quad a(\theta) = \begin{bmatrix} 1 \\ \exp(j\Delta\phi) \\ \exp(j2\Delta\phi) \\ \exp(j3\Delta\phi) \\ \exp(j4\Delta\phi) \\ \exp(j5\Delta\phi) \end{bmatrix}, \quad \Delta\phi = 2\pi\frac{d}{\lambda}\sin\theta \quad (4)$$

In the equation (4), eiH represents the complex conjugate transposition of eigenvector ei, K represents the number of incident signals, $\lambda$ represents the wavelength and d represents the element interval of the reception antennas 6 to 11. Subsequently, the direction calculator 32 extracts a direction $\theta$ at which the MUSIC spectrum is peak (step S107). Specifically, when the MUSIC spectrum of the direction being noted is larger than the MUSIC spectra before and after the MUSIC spectrum concerned, the direction concerned is calculated as the peak direction.

The thus-extracted peak directions are successively set as the direction $\theta$ of the target 40 in the decreasing order of the MUSIC spectrum. In the example of FIG. 4, $\theta$1, $\theta$2 are calculated as the directions $\theta$ of the two targets.

The steps S105 to S107 correspond to the basic processing of MUSIC, and the detailed description thereof is omitted because it is made open to public in various well-known documents.

Finally, the target detector 1 determines whether the calculation of targets whose number K is counted in step S103 is completed or not (step S108). If the calculation is not completed (that is, NO), the processing returns to step S104 to repetitively execute the processing of the steps S104 to S107.

On the other hand, in step S108, if it is determined that the calculation has been executed at the frequency corresponding to the number of the targets (that is, Yes), the distance R, the relative speed V or the direction $\theta$ of all the targets 40 are output as target information to the external device (not shown).

As described above, according to the embodiment 1 of the present invention, the direction calculator 32 secure the snapshot number by utilizing the correlation matrix generated from the UP-section peak frequency spectrum and the correlation matrix generated from the DOWN-section peak frequency spectrum, and the direction of the target is calculated on the basis of the summed correlation matrix obtained by adding both the correlation matrixes, so that the snapshot number can be secured in short time and the direction to the target can be calculated with high precision.

In the above embodiment, the six reception antennas 6 to 11 (see FIG. 1) are used. However, the present invention can be likewise applied even when reception antennas of a different number are used.

Furthermore, in the above embodiment, two sections of the UP-section and the DOWN-section are used as the modulation section. However, the present invention is likewise applicable even when the number of the modulation sections is equal to three or more, the modulation sections are combined with another modulation section such as non-modulation or the like or the frequency modulation width or the modulation time is changed every section.

Still furthermore, in order to suppress the correlation of the incoming waves, a so-called spatial averaging method for determining an average value of correlation matrixes obtained by properly moving the reception position may be used.

Furthermore, the MUSIC method is used as the direction calculation processing of the target 40 by the direction calculator 32. However, the present invention may be applied to a radar device using another method such as unitary MUSIC method, ESPRIT method, unitary ESPRIT method or the like. Particularly, when the unitary method is used, only the real number portion of the correlation matrix may be used, and thus the operation load can be further reduced.

Still furthermore, the FM-CW system is used as a system for detecting the distance R and the relative speed V of the target 40. However, the present invention is applicable to a radar device in which the transmission signal is modulated to be sectioned in the form of pulse.

Various modifications and alterations of this invention will be apparent to those skilled in the art without departing from the scope and spirit of this invention, and it should be understood that this is not limited to the illustrative embodiments set forth herein.

What is claimed is:

1. A radar device comprising:
a transmitting unit for transmitting a transmission signal having plural modulation sections;
a receiving unit for receiving a reflection signal obtained through reflection of the transmission signal from a target by an array antenna having plural channels;
a mixing unit for mixing the transmission signal with reception signals of the plural channels to obtain beat signals of the plural channels;
a frequency analyzing unit for frequency-analyzing the beat signals of the plural channels; and
a direction calculating unit for calculating the direction to the target on the basis of frequency analysis results of the plural channels, wherein the direction calculating unit sums correlation matrixes generated from peak frequency spectrum of the plural modulation sections to obtain a summed correlation matrix, and calculating the direction to the target on the basis of the summed correlation matrix.

2. The radar device according to claim 1, wherein the modulation sections of the transmission unit are subjected to frequency modulation so that the frequency varies with time lapse.

3. The radar device according to claim 2, wherein the modulation sections are subjected to the frequency modulation so that frequency modulation width is different every modulation section.

4. The radar device according to claim 2, wherein the modulation sections are subjected to the frequency modulation so that modulation time is different every modulation section.

5. The radar device according to claim 2, wherein the modulation sections are subjected to the frequency modulation so that both frequency modulation width and modulation time are different every modulation section.

6. The radar device according to claim 2, wherein the modulation sections of the transmission unit have an UP section in which the frequency increases with time lapse and a DOWN section in which the frequency decreases with time lapse.

7. The radar device according to claim 6, wherein the modulation sections of the transmitting unit have alternately repetitive arrangement of an UP section in which frequency increases with time lapse and a DOWN section in which the frequency decreases with time lapse.

8. The radar device according to claim 6, wherein the direction calculating unit generates a summed correlation matrix by adding correlation matrixes generated from UP-section peak frequency spectra and a correlation matrixes generated from DOWN-section peak frequency spectra, and calculates the direction to the target on the basis of the summed correlation matrix.

9. The radar device according to claim 7, wherein the direction calculating unit generates a summed correlation matrix by adding correlation matrixes generated from UP-section peak frequency spectra and a correlation matrixes generated from DOWN-section peak frequency spectra, and calculates the direction to the target on the basis of the summed correlation matrix.

* * * * *